United States Patent
Broumandan

(10) Patent No.: US 11,506,794 B2
(45) Date of Patent: Nov. 22, 2022

(54) SYSTEMS AND METHODS FOR GNSS CARRIER PHASE MULTIPATH MITIGATION USING A BLANKED CORRELATOR IN CONJUNCTION WITH A FULL CORRELATOR

(71) Applicant: NovAtel Inc., Calgary (CA)

(72) Inventor: Ali Broumandan, Calgary (CA)

(73) Assignee: NovAtel Inc., Calgary (CA)

( * ) Notice: Subject to any disclaimer, the term of this patent is extended or adjusted under 35 U.S.C. 154(b) by 0 days.

(21) Appl. No.: 16/854,479

(22) Filed: Apr. 21, 2020

(65) Prior Publication Data

US 2021/0325545 A1 Oct. 21, 2021

(51) Int. Cl.
*G01S 19/22* (2010.01)
*G01S 19/29* (2010.01)

(52) U.S. Cl.
CPC ............. *G01S 19/22* (2013.01); *G01S 19/29* (2013.01)

(58) Field of Classification Search
CPC ........... G01S 19/22; G01S 19/29; G01S 19/43
See application file for complete search history.

(56) References Cited

U.S. PATENT DOCUMENTS

| | | | |
|---|---|---|---|
| 5,101,416 A | 3/1992 | Fenton et al. | |
| 5,390,207 A | 2/1995 | Fenton et al. | |
| 5,402,450 A | 3/1995 | Lennen | |
| 5,495,499 A | 2/1996 | Fenton et al. | |
| 5,963,582 A * | 10/1999 | Stansell, Jr. | ............ G01S 19/22 370/320 |

(Continued)

FOREIGN PATENT DOCUMENTS

| | | |
|---|---|---|
| EP | 0892277 | 1/1999 |
| WO | 2015041566 | 3/2015 |

OTHER PUBLICATIONS

M. Irsigler et al, "Comparison of Multipath Mitigation Techniques with Consideration of Future Signal Structures", Institute of Geodesy and Navigation, University FAF Munich, Germany, ION GPS 2003, Portland, Oregon, 13 pages.

(Continued)

*Primary Examiner* — Bernarr E Gregory
*Assistant Examiner* — Fred H Mull
(74) *Attorney, Agent, or Firm* — Cesari and McKenna, LLP

(57) ABSTRACT

Techniques are provided for GNSS carrier phase multipath mitigation using a blanked correlator in conjunction with a full correlator. A tracking loop may track a carrier of the GNSS signal utilizing the full correlator. A chip-edge accumulation (CEA) unit of the tracking loop may accumulate chip edges of a ranging code to generate CEA output. A blanked correlator may receive the CEA output to generate blanked correlator values. A running-sum filter may utilize the blanked correlator values to generate a running-sum value. A phase estimate may utilize the running-sum value to generate phase estimator output. In an exemplary embodiment, the blanked correlator operates as a monitoring correlator and the phases estimator output is the estimated carrier phase multipath error. In an exemplary embodiment, the blanked correlator provides input to the tracking loop and discriminator output is subtracted from the phase estimator output to generate the estimated carrier phase multipath error.

20 Claims, 11 Drawing Sheets

(56) References Cited

U.S. PATENT DOCUMENTS

| | | | | |
|---|---|---|---|---|
| 6,002,728 | A | * | 12/1999 | Blois .................. H04L 7/046 375/326 |
| 6,243,409 | B1 | | 6/2001 | Fenton et al. |
| 6,687,316 | B1 | | 2/2004 | McGraw |
| 2006/0215739 | A1 | | 9/2006 | Williamson et al. |
| 2007/0058700 | A1 | * | 3/2007 | Fenton ................ G01S 19/30 375/150 |
| 2007/0064776 | A1 | | 3/2007 | Feller et al. |
| 2007/0211793 | A1 | | 9/2007 | Han |
| 2017/0170854 | A1 | * | 6/2017 | Soualle ............... G01S 19/24 |
| 2021/0263161 | A1 | * | 8/2021 | Broumandan ...... G01S 19/22 |

OTHER PUBLICATIONS

McGraw, Gary A., Braasch, Michael S., "GNSS Multipath Mitigation Using Gated and High Resolution Correlator Concepts," *Proceedings of the 1999 National Technical Meeting of The Institute of Navigation*, San Diego, CA, Jan. 1999, pp. 333-342.

European Search Report dated Sep. 20, 2021 for European Patent Application No. 21169470.8 for NovAtel Inc., 9 pages.

"European Search Report and Written Opinion," European Application No. 21158606.0-1206, Applicant: NovAtel, Inc., dated Jun. 23, 2021, pp. 1-11.

Pirsiavash et al. "Characterization of Signal Quality Monitoring Techniques for Multipath Detection in GNSS Applications," Sensors 2017, 17, 1579; doi:10.3390/s17071579, 24 pages.

Estey et al., "Teqc Tutorial—Basics of Teqc Use and Teqc Products," UNAVACO, Boulder, CO, Jun. 6, 2014, 61 pages.

Bui et al., "GPS-Bades Indoor/Outdoor Detection Scheme Using Machine Learning Techniques," Appl. Sci., 2020, 10, 500; doi:10.3390/app10020500, 19 pages.

Fenton, et al., "The Theory and Performance of NovAtel Inc.'s Vision Correlator," ION GNSS 2005 Long Beach, CA, 9 pages.

Herberger "Real-Time Software Defined GPS Receiver" Master of Science in Engineering Thesis submitted Aug. 2013 to Purdue University, 167 pages.

Jan Van Sickle, Tracking Loops, GEOG 862: GPS and GNSS for Geospatial Professionals, Pennsylvania State University, 2018, retrieved from the Internet Jan. 28, 2020, https://www.e-education.psu.edu/geog862/node/1785, 6 pages.

Khaing et al., "Implementation of Code and Carrier Tracking Loops for Software GPS Receivers," International Journal of Scientific & Technology Research vol. 4, Issue 06, Jun. 2015, 7 pages.

Gunawardena et al., "Chip Transition-Edge Based Signal Tracking for Ultra-Precise GNSS Monitoring Applications," Proceedings of the ION 2015 Pacific PNT Meeting, Apr. 20-23, 2015, Honolulu, HI, pp. 100-106 abstract only.

Gunawardena et al., "Chip Transition-Edge Based Signal Tracking for Ultra-Precise GNSS Monitoring Applications," A Satellite with Personality, by GPS World, Aug. 7, 2015, 12 pages.

Reed, Rachel E., "Real-Time Implementation and Analysis of Chip Shaped-Based Software Defined Receiver," Master of Science in Electrical Engineering Thesis submitted May 2017 to University of Dayton, 80 pages.

Phelts, Robert Eric, "Multicorrelator Techniques for Robust Mitigation of Threats to GPS Signal Quality," Doctor of Philosophy Thesis submitted Jun. 2001 to Stanford University, 345 pages.

* cited by examiner

SYSTEMS AND METHODS FOR GNSS CARRIER PHASE MULTIPATH MITIGATION USING A BLANKED CORRELATOR IN CONJUNCTION WITH A FULL CORRELATOR

BACKGROUND

Technical Field

The invention relates generally to Global Navigation Satellite System (GNSS) receivers, and in particular, to systems and methods for GNSS carrier phase multipath mitigation using a blanked correlator in conjunction with a full correlator.

Background Information

Multipath propagation is one of the main error sources in Global Navigation Satellite System (GNSS) Receivers. Multipath errors affect both carrier and code measurements. For example, and in nominal open sky GNSS environments, the code error caused by multipath signals may be within a couple of meters which may negatively affect the position and navigation performance. In addition, the carrier phase error caused by multipath signals may reach a maximum of quarter of a cycle which may be approximately 5 centimeters. Such error may negatively affect, for example, the performance of carrier phase based positioning methods.

SUMMARY

Techniques are provided for Global Navigation Satellite System (GNSS) carrier phase multipath mitigation using a blanked correlator in conjunction with a full correlator. A tracking loop of the GNSS receiver may track a carrier of the GNSS signal utilizing a full correlator. For example, the full correlator may be a prompt full correlator that aligns a local replica of a ranging code, e.g., a pseudo-random noise (PRN) code, with the incoming signal. The tracking loop may further include a chip-edge accumulation (CEA) unit that may implement a CEA process by accumulating all the chip edges of a ranging code into a composite chip edge transition.

A carrier phase multipath mitigation module may include a blanked correlator with narrow spacing d, e.g., d=0.1 chips. In an exemplary embodiment, corrections to the carrier phase measurements are applied external to the tracking loop. In this exemplary embodiment, the blanked correlator operates as a monitoring correlator that is independent of and does not affect the operation of the tracking loop. The blanked correlator may receive the CEA output and generate blanked correlator values. A running-sum filter may utilize the blanked correlator values to generate a running-sum value that may be transmitted to a phase estimator that may estimate the carrier phase multipath error.

The estimated carrier phase multipath error may be transmitted to and further smoothed by the low pass filter to reduce noise, and the output from the low pass filter may be used as a correction for the carrier phase measurements. Specifically, the GNSS receiver may subtract, external to the tracking loop, the estimated carrier phase multipath error from the carrier phase measurements to mitigate, i.e., reduce or remove, multipath error and generate corrected carrier phase measurements.

In an exemplary embodiment, multipath mitigation is directly applied within the tracking loop. In this exemplary embodiment, the multipath mitigation module that includes the blanked correlator is utilized as input to the tracking loop to update discriminator outputs of the tracking loop. Accordingly, the discriminator output of the tracking loop is provided to the carrier phase multipath mitigation module and subtracted from the output of the phase estimator of the blanked correlator to estimate the carrier phase multipath error. The estimated carrier phase multipath error, after noise reduction by the low pass filter, may be added to the discriminator output of the tracking loop to mitigate the multipath error within the tracking loop and generate corrected carrier phase measurements.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
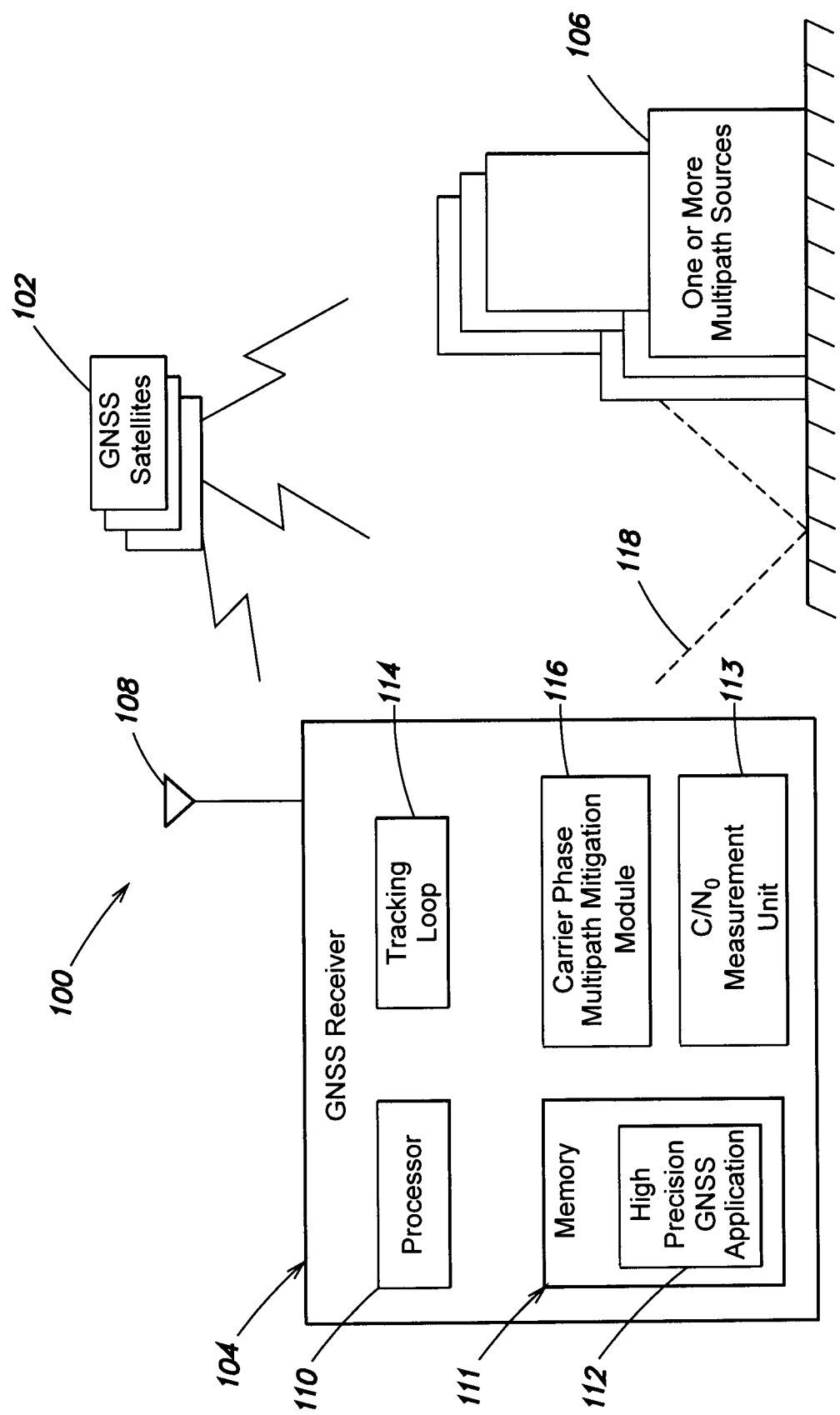
FIG. 1 is an example system according to one or more embodiments described herein.

Referring to FIG. 1, a system 100 includes one or more Global Navigation Satellite System (GNSS) satellites 102, a GNSS receiver 104, and one or more multipath sources 106. The one or more GNSS satellites 102 may be associated with one or more different GNSS constellations of satellites (e.g., GPS, Galileo, QZSS, BeiDou, and/or Glonass) and may transmit one or more GNSS signals.

The one or more multipath sources 106 may produce one or more multipath signals 118. As known by those skilled in the art, multipath refers to the phenomenon when GNSS signals are reflected before reaching the GNSS receiver 104 (i.e., the antenna 108 of the GNSS receiver 104). For example, the one or more multipath sources 106 may be any entity or structure, e.g., buildings in an urban environment, that reflects the GNSS signals before they reach the GNSS receiver 104. The multipath signals 118, i.e., reflected signals, may cause erroneous measurements that lead to positioning accuracy degradation computed by the GNSS receiver 104.

The GNSS receiver 104 may include the antenna 108, a processor 110, a memory 111, a tracking loop 114, and a carrier phase multipath mitigation module 116. The GNSS receiver 104 may operate in a known manner to compute position based on the timing of codes (e.g., a pseudo-random noise (PRN) code that is unique to each GNSS satellite and includes a random distribution of zeros and ones) and carriers in the GNSS satellite signals received at antenna 108. The tracking loop 114 may operate to implement carrier and/or code tracking loop techniques to achieve synchronization with incoming GNSS signals transmitted by the one or more GNSS satellites 102.

The memory 111 may store data, received values, and/or computed values in accordance with one or more embodiments described herein. In addition, memory 111 may store high precision GNSS application 112 that may be executed by processor 110. The high precision GNSS application 112 may implement one or more position and navigation services to compute position with higher accuracy and reduced convergence time.

For example, such high precision services may include, but are not limited to, Precise Point Positioning (PPP) and/or Real-Time Kinematics (RTK). The carrier phase multipath mitigation module 116 may implement one or more carrier phase multipath mitigation, i.e., reduction or removal, techniques according to one or more embodiments described herein.

Figure 2:
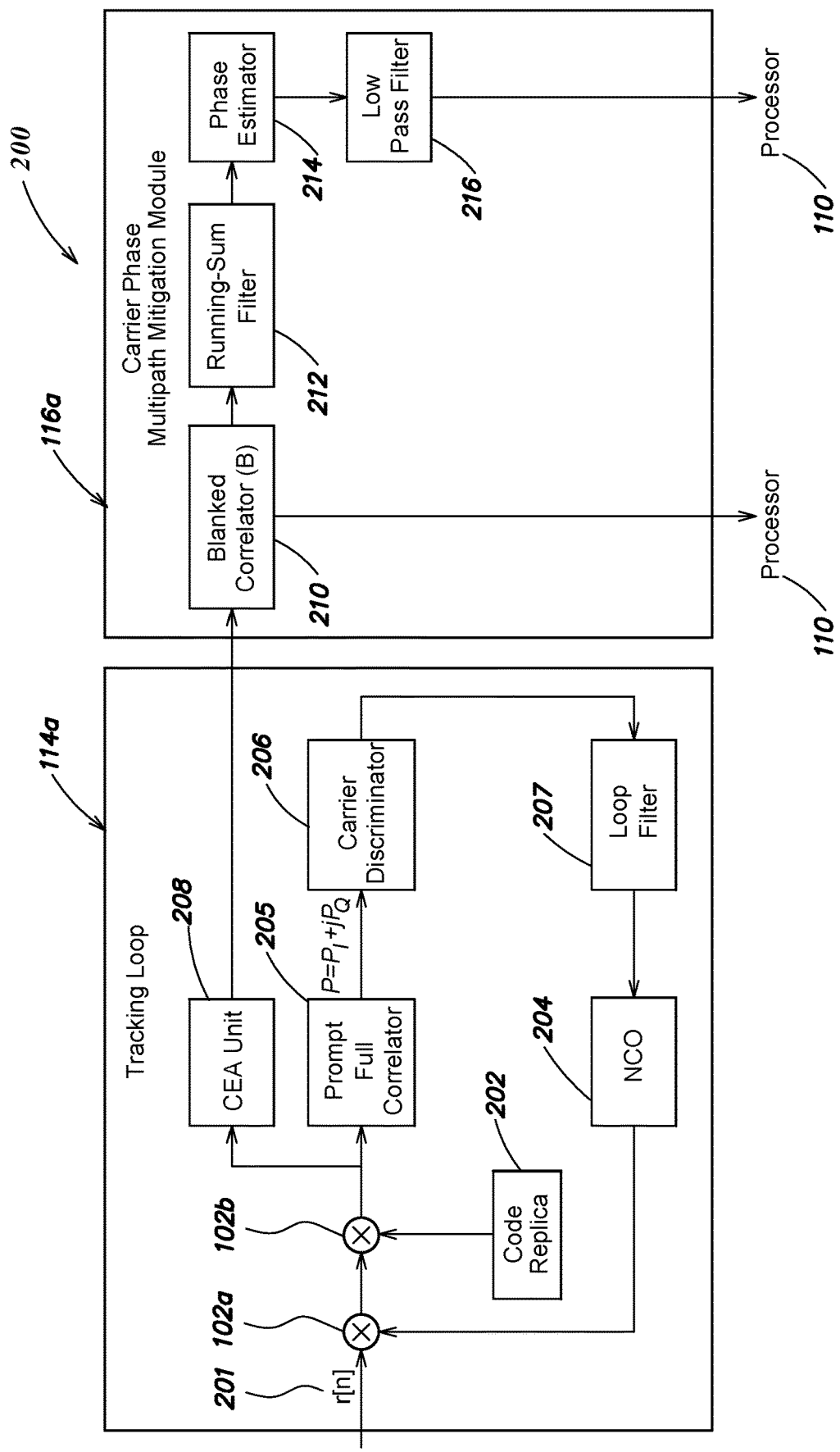
FIG. 2 is an example schematic block diagram of a tracking loop and a carrier phase multipath mitigation module with a blanked correlator, that operates as a monitoring correlator, to implement a carrier phase multipath mitigation technique external to the tracking loop according to one or more embodiments described herein.

In an exemplary embodiment, corrections to the carrier phase measurements are applied external to the tracking loop. FIG. 2 is an example schematic block diagram 200 of a tracking loop 114a and a carrier phase multipath mitigation module 116a with a blanked correlator 210, that operates as a monitoring correlator, to implement a carrier phase multipath mitigation technique external to the tracking loop 114a according to one or more embodiments described herein. The tracking loop 114a may implement a carrier tracking loop technique to achieve synchronization with incoming GNSS signals transmitted by the one or more GNSS satellites 102. In an exemplary embodiment, the tracking loop 114a may be a phase lock loop (PLL).

Samples r[n] 201 of the GNSS signals received at antenna 108 may enter the correlation process of the tracking loop 114a. The samples r[n] 201 may be multiplied with a carrier replica, e.g., output by the Numerical Control Oscillator (NCO) 204, at multiplier 102a (i.e., carrier wipe-off), and may be multiplied with a code replica 202 at multiplier 102b (i.e., code wipe-off). The prompt full correlator 205 may align a local replica of the ranging code with the ranging code in the incoming GNSS signal. The prompt full correlator integrates and dumps the full/entire length of the ranging code, e.g., 1023 chips of a PRN code. The coherent integration time of the prompt full correlator 205 may be a value between 1 ms to 20 ms. Alternatively, the coherent integration time of the prompt full correlator may be a different value.

Based on the accumulation, the prompt full correlator 205 may generate complex prompt correlator values, e.g., $P=P_I+jP_Q$ where I is the in-phase component and Q is the quadrature component, that may be transmitted to the carrier discriminator 206. The carrier discriminator 206 may process the prompt correlator values and generate discriminator outputs. Specifically, the carrier discriminator 206 may generate the discriminator outputs based on a $\tan(P_Q/P_I)$. The loop filter 207 may filter the discriminator outputs to reduce noise and the Numerically-Controlled-Oscillator (NCO) 204 may generate carrier phase values that are used for the next carrier wipe-off in the tracking loop 114a.

Therefore, the prompt I and Q values, e.g., $P_I$ and $P_Q$, are utilized by the tracking loop 114a to track the carrier phase of the incoming GNSS signals. The tracking loop 114a operating based on the prompt full correlator 205 as described herein may, for example, compensate for the signal dynamics that may include, but are not limited to, the receiver oscillators drift, satellites, etc.

Figure 3:
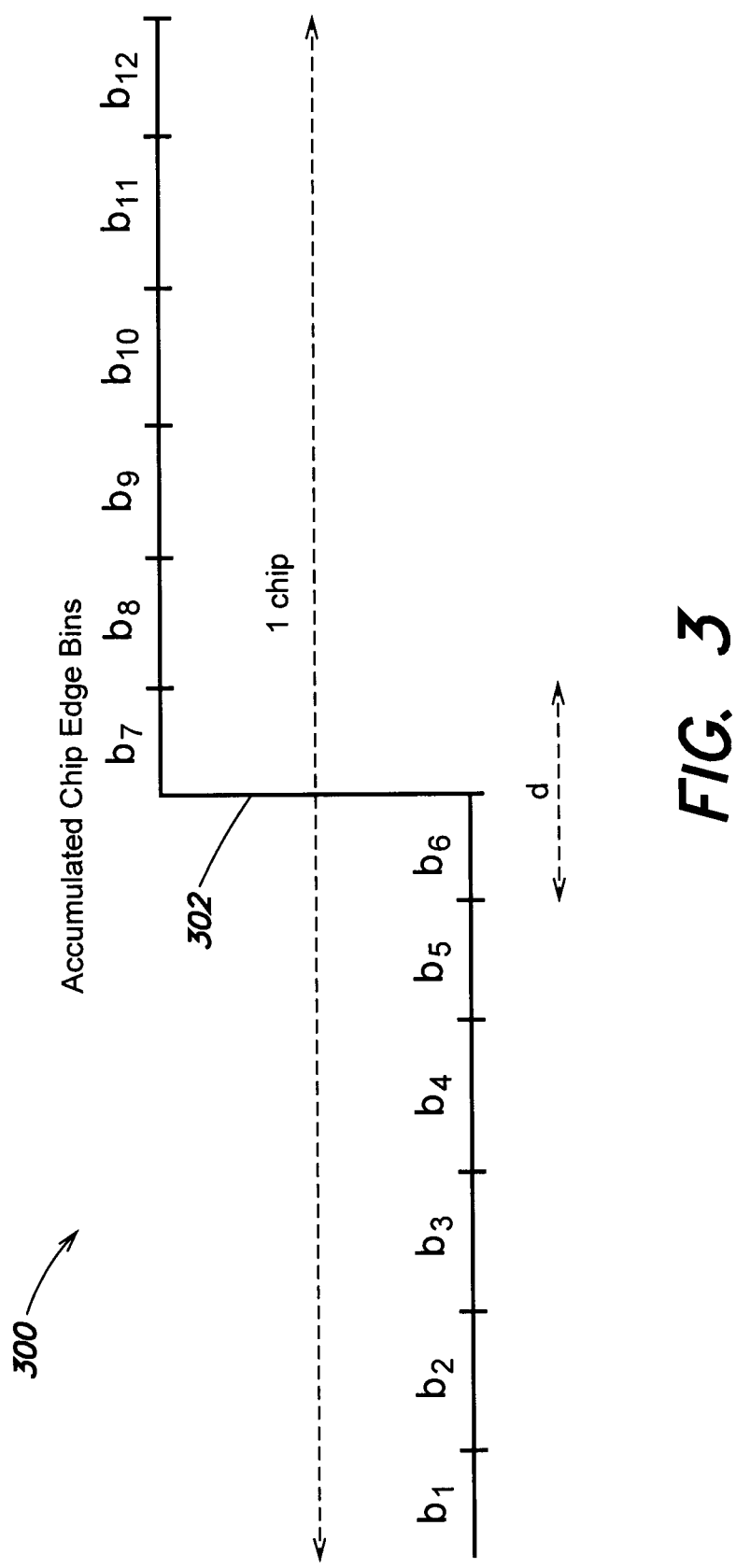
FIG. 3 is an example plot depicting a composite chip edge transition between two chips that may be generated by a CEA unit based on an accumulation of the chip edges of a ranging code according to one or more embodiments described herein.

The tracking loop 114a may further include a chip-edge accumulation (CEA) unit 208 that may receive the samples after carrier and code wipe-offs and may implement a CEA process. Specifically, the CEA unit 208 may implement the CEA process by accumulating all the chip edges of a ranging code into a composite chip edge transition. FIG. 3 is an example plot 300 depicting a composite chip edge transition 302 between two chips that may be generated by the CEA unit 208 based on an accumulation of the chip edges of a ranging code according to one or more embodiments described herein. For example, PRN 1 of GPS L1C/A consists of 1023 chips with 512 chip edges. Thus, the prompt full correlator 205 may utilize all 1023 chips, i.e., the full code length, for tracking the carrier phase, while the CEA unit 208 may only utilize the 512 chip edges. Specifically, the CEA unit 208 may accumulate all 512 chip edges, e.g., a transition from 1 to −1 and from −1 to 1, with width of 1 chip. FIG. 3 illustrates a composite chip edge transition 302 between two chips that is based on all the chip edges of a GNSS PRN code accumulated by the CEA unit 208 that implements the CEA process. In addition, in the example of FIG. 3, the accumulated chip edges have a resolution of 12 bins.

In addition, and as depicted in FIG. 3, an accumulated chip (accumulation over a span of one chip) may be divided into an arbitrary number of M bins, $b_m$, where m is the individual bin number from 1 to M, e.g., for M=12 bins. The width of each bin at negative and positive parts of the chip edge transition 302, respectively, can be selected arbitrarily. However, mirror bins at each side of the chip edge transition 302 preferably have the same width. For instance, $b_5$ and $b_6$ can have different widths, while $b_6$ and $b_7$ preferably have the same width because they are mirror bins on different sides of the chip edge transition 302. Using this configuration, different correlators may be generated using the composite chip edge transition 302 generated based on the CEA accumulation process as depicted in FIG. 3.

For example, the CEA unit 208 may construct a CEA based punctual correlator ($P_{CEA}$) based on:

$$P_{CEA}=b^T w_P,$$

where $$b=[b_1,b_2,\ldots,b_{12}]^T$$

$$w_P=[-1,-1,-1,-1,-1,-1,+1,+1,+1,+1,+1,+1]^T,$$

where b is a vector based on the widths of the individual CEA bins as depicted in FIG. 3, where $w_P$ is a weight vector applied to the CEA bins, and where T is the transpose operator. The coherent integration time of the CEA unit 208 may be a value from 1 ms to 20 ms. In an exemplary embodiment, the coherent integration time of the CEA unit 208 and the prompt full correlator 205 may be the same (e.g., 10 ms). Alternatively, the is coherent integration times of the CEA unit 208 and the prompt full correlator 205 may be different.

Referring back to FIG. 2, the CEA output, e.g., accumulated chip edge bins, from the CEA unit 208 may be transmitted to the blanked correlator 210 of the carrier phase multipath mitigation module 116a. The blanked correlator 210 operates as a monitoring correlator as it does not affect the operation of the tracking loop 114a in FIG. 2. The blanked correlator 210 may correlate signal samples (e.g., I and Q samples) and generate blanked correlator values based on:

$$B = b^T w_B,$$

where $$b = [b_1, b_2, \ldots, b_{12}]^T,$$

$$w_B = [0,0,0,0,0,-1,+1,0,0,0,0,0]^T,$$

where B is a blanked correlator value that is complex and equal to $B_I + jB_Q$, and $w_B$ is the weight vector applied to the CEA bins that is all zeros except for a fraction of a code chip that corresponds to the times of the chip edge transition(s) in the local PRN code. In an exemplary embodiment, the blanked correlator 210 is implemented with an arbitrary correlator spacing d (e.g., d=0.1 chips) as referenced in FIG. 3. The blanked correlator 210 with a "narrow" spacing (e.g., small d value) results in power loss e.g., reduced power when compared to the power of a full correlator, e.g., the prompt full correlator 205.

To compensate for the power loss of the blanked correlator 210 due to the spacing d (e.g., d=0.1 chips), the coherent integration time of the blanked correlator 201 may be increased. For example, and when the coherent integration time of the prompt full correlator 205 and the CEA unit 208 are 1.0 ins, the coherent integration time of the blanked correlator may be 100 ms.

The blanked correlator values, e.g., $B = B_I + jB_Q$, may be transmitted to running-sum filter 212. The running-sum filter 212 may integrate the blanked correlator values by N epochs to reduce noise and enhance signal strength. Specifically, the running-sum filter 212 may be based on:

$$B = \sum_{i=k-(N-1)}^{k} B_i,$$

where k is an integer that is equal to or greater than N.

The choice of N may depend on the spacing d of the blanked correlator 210 (e.g., d=0.1 chips). In an exemplary embodiment, N may be a value from 10 to 20 samples. For example, when the coherent integration time of the prompt full correlator 205 and CEA unit 208 are 10 ms, and the coherent integration time of the blanked correlator is 100 ms, N may be 10. Alternatively, N may be a different value.

The outputs of the running-sum filter 212, i.e., running-sum values (e.g., $B = \Sigma B_I + j\Sigma B_Q$), may be transmitted to the phase estimator 214 that may estimate the carrier phase multipath error. Specifically, the phase estimator 214 may estimate the carrier phase multipath error based on a tan ($\Sigma B_Q / \Sigma B_I$). The estimated carrier phase multipath error may be transmitted to and further smoothed by the low pass filter 216 to reduce noise, and the output from the low pass filter 216 may be used as a correction for the carrier phase measurements.

Specifically, the estimated carrier phase multipath error may be transmitted to the processor 110. The processor 110 may utilize the estimated carrier phase multipath error with the carrier phase measurements, obtained by the GNSS receiver 104, to generate corrected carrier phase measurements. Specifically, the processor 110 may subtract the estimated carrier phase multipath error from the carrier phase measurements to mitigate, i.e., reduce or remove, the multipath error in the carrier phase measurements to generate corrected carrier phase measurements.

The corrected carrier phase measurements may be utilized by a high precision GNSS application 112 to implement one or more position and navigation services to compute position with higher accuracy and reduced convergence time. For example, such high precision services may include, but are not limited to, PPP and/or RTK.

In addition, the GNSS receiver 104 may record carrier-to-noise power ratio (C/No) that may be used as a measure of signal quality and/or for comparison of signal strengths between channels and GNSS satellites 102. When the $C/N_0$ is calculated based on the prompt full correlator 205, in the presence of multipath signals, the $C/N_0$ measured is negatively affected and thus unreliable. Therefore, the GNSS receiver 104 may measure the $C/N_0$ based on the blanked correlator values of the blanked correlator 210 that may be more reliable due to the narrow spacing of the blanked correlator 210.

Specifically, the blanked correlator 210 has less power when compared to the prompt full correlator 205. The ratio of the prompt full correlator 205 (F) to the blanked correlator 210 (B) may be k=F/B that is a function of d (correlator spacing used to generate the blanked correlator) and the number of edges in the ranging code (e.g., PRN code). The blanked correlator values may be provided to the processor 110, as depicted in FIG. 2, and the processor 110 may calculate value of k in the absence of multipath in a calibration process. The processor 110 may then multiply B by k to estimate the prompt full correlator 205 in the presence of multipath, thus using the blanked correlator 210. The processor 110 may provide the estimate of the prompt full correlator ($P_B$) to the $C/N_0$ measurement unit 113 that estimates $C/N_0$ using the Blanked correlator as ($C/NO^B$), where $C/N_0^B$ may be less affected by multipath.

FIGS. 4A-4D are example plots for the performance of the tracking loop 114a and the carrier phase multipath mitigation module 116a of FIG. 2 according to one or more embodiments described herein.

Figure 4A:
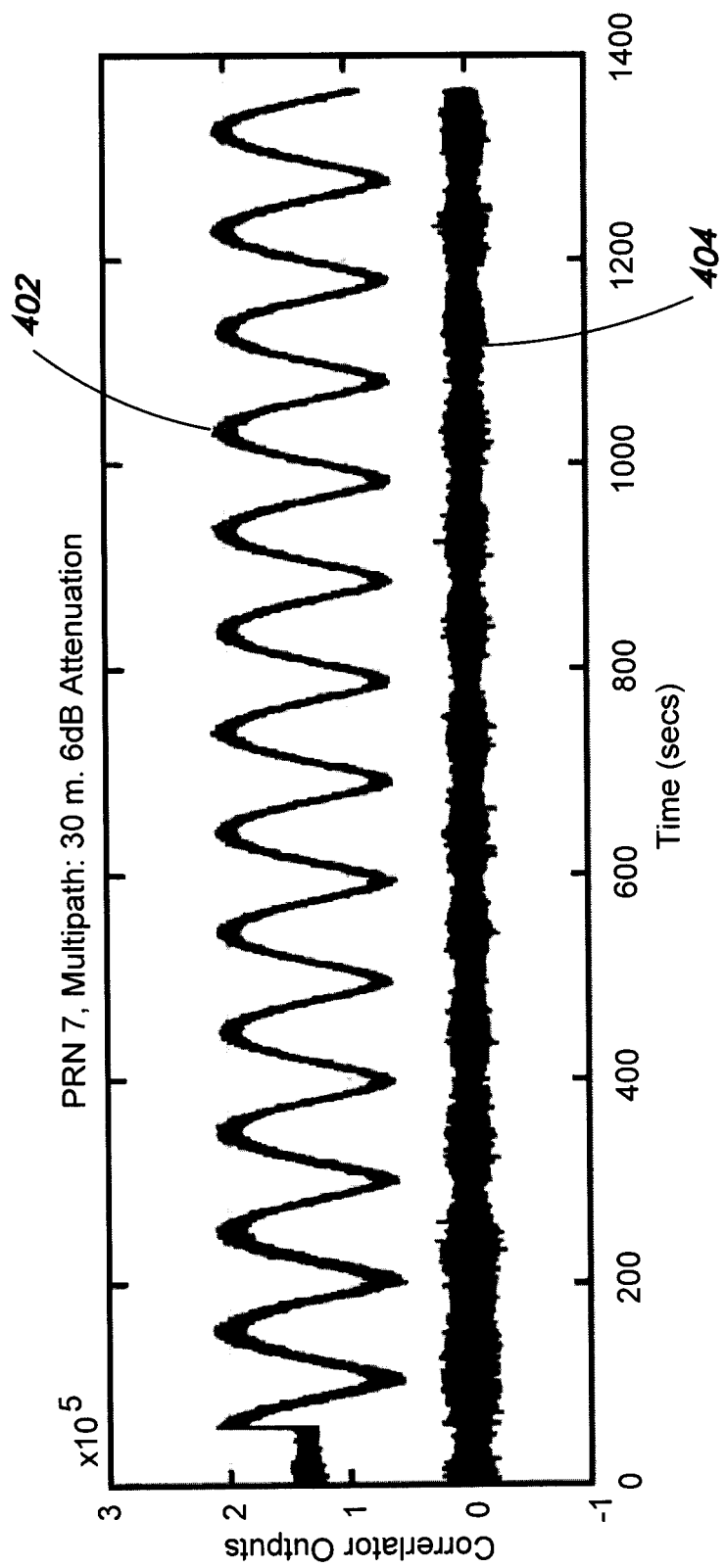
FIGS. 4A-4D are example plots for the performance of the tracking loop and the carrier phase multipath mitigation module of FIG. 2 according to one or more embodiments described herein.

The plots of FIG. 4A-4D may be based on specular multipath distanced approximately 30 meters from line of sight (LOS) GNSS signals with 6 dB attenuation. FIG. 4A depicts example I values and Q values (e.g., $P_I$ and $P_Q$) generated by the prompt full correlator 205. During the first 50 s, only the LOS signals are present. During the presence of multipath signals after the 50 s, the prompt full correlator 205 forces energy over the I channel 402 to track the carrier of the incoming GNSS signals, while energy over the Q channel 404 is near zero. The constructive and destructive effects of multipath signals cause fluctuations on signal amplitude over the I channel 402 as shown in FIG. 4A.

Figure 4B:
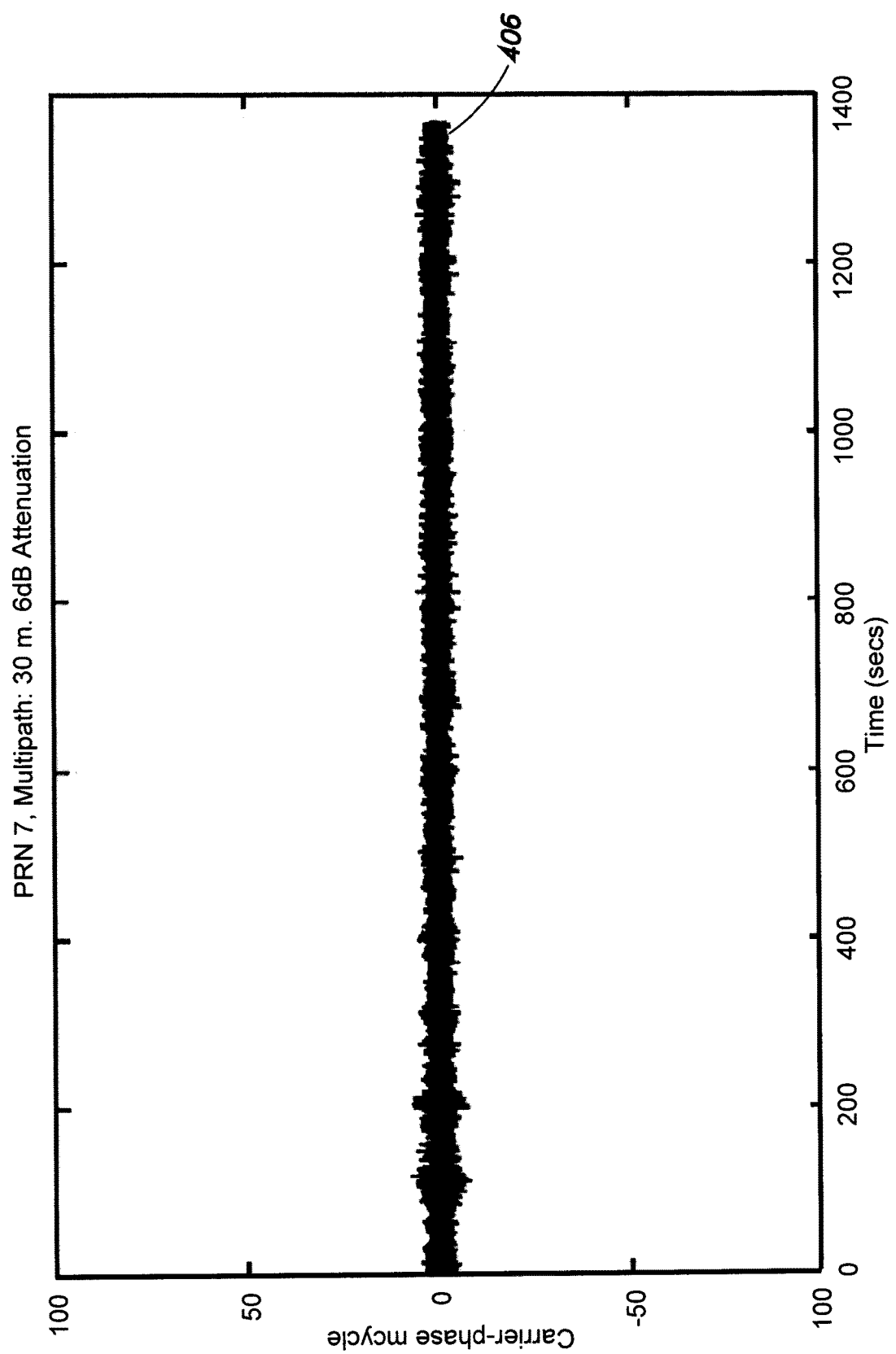

FIG. 4B depicts example output of the carrier discriminator 206 of FIG. 2. As depicted in FIG. 4B, the discriminator outputs 406 of the carrier discriminator 206 are small and near zero.

Figure 4C:
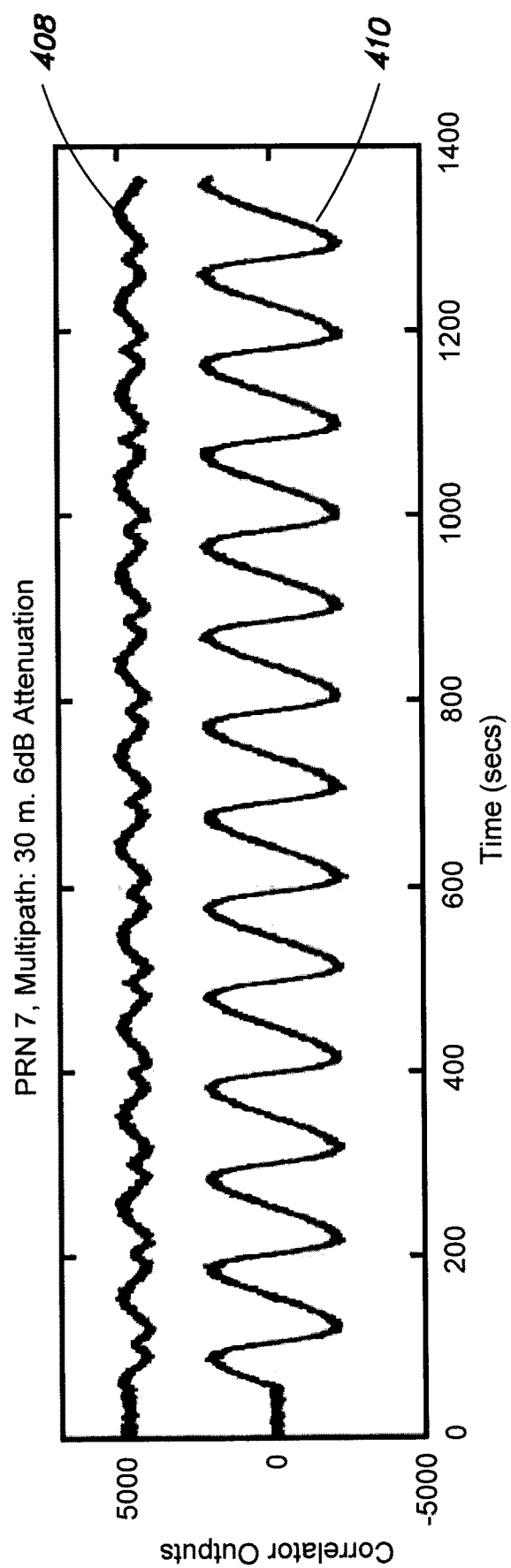

FIG. 4C depicts example I and Q values (e.g., $B_I$ and $B_Q$) generated by the blanked correlator 210 of FIG. 2. During the presence of multipath signals after the 50 s, both the I channel 408 and Q channels 410 of the blanked correlator 210 are affected by multipath which may be used to estimate the carrier phase multipath error as described with reference to FIG. 2.

Figure 4D:
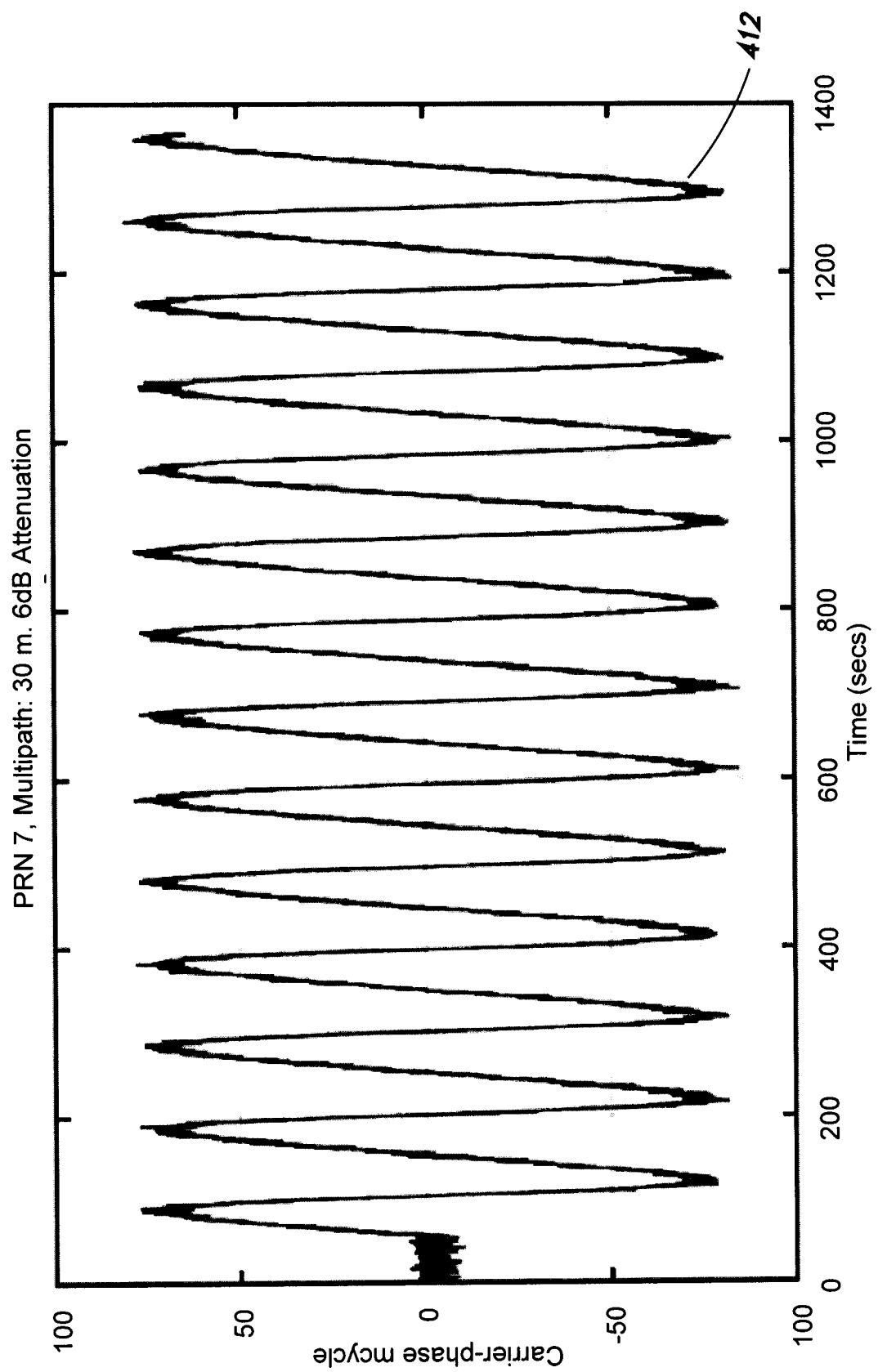

FIG. 4D depicts example output 412 of the phase estimator 214 of FIG. 2. As depicted in FIG. 4D, the phase estimator 214 measures the estimated carrier phase multipath error 412 (e.g., a $\tan(\Sigma B_Q/\Sigma B_I)$) in the presence of multipath, and measures no phase error when there is no multipath (before 50 s).

Figure 5:
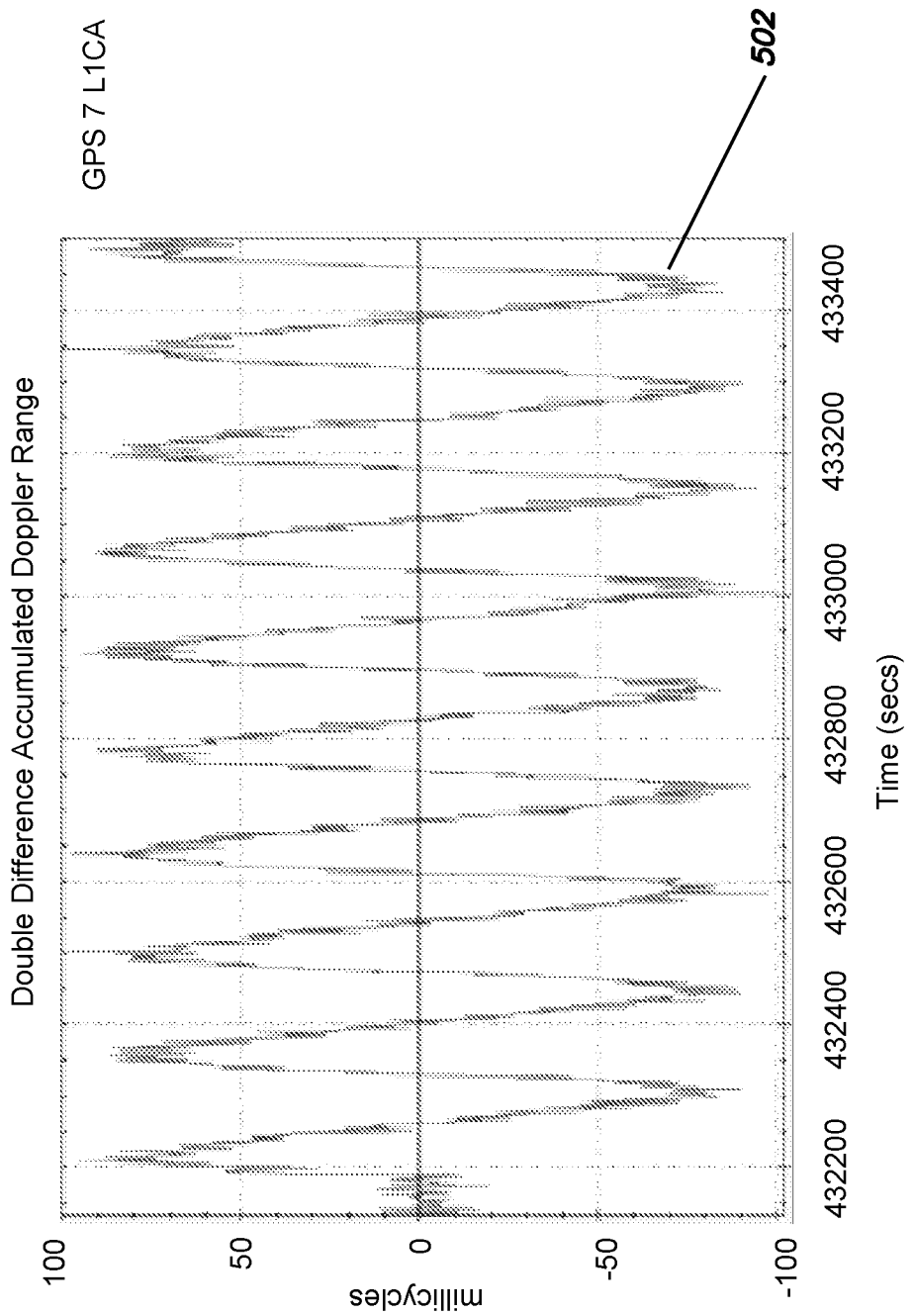
FIG. 5 is an example plot showing actual carrier phase error calculated based on the presence of the same specular multipath of FIGS. 4A-4D according to one or more embodiments described herein.

FIG. 5 is an example plot showing actual carrier phase error 502 calculated based on the presence of the same specular multipath of FIGS. 4A-4D according to one or more embodiments described herein. The actual carrier phase error measurements of FIG. 5 may be calculated by double differencing of a zero-baseline scenario for PRN 7. FIG. 5 illustrates the actual phase error 502 observed in PRN 7 when affected by multipath. As confirmed by FIG. 5, the carrier phase error 502 calculated due to multipath are the same as the outputs of the phase estimator 214 as illustrated in FIG. 4D. Thus, the plots of FIGS. 4A-4D and FIG. 5 validate that the output of the phase estimator 214, which are based on the outputs of the blanked correlator 210, may serve as the estimated carrier phase multipath error to correct the carrier phase measurements obtained by the GNSS receiver 104.

Figure 6:
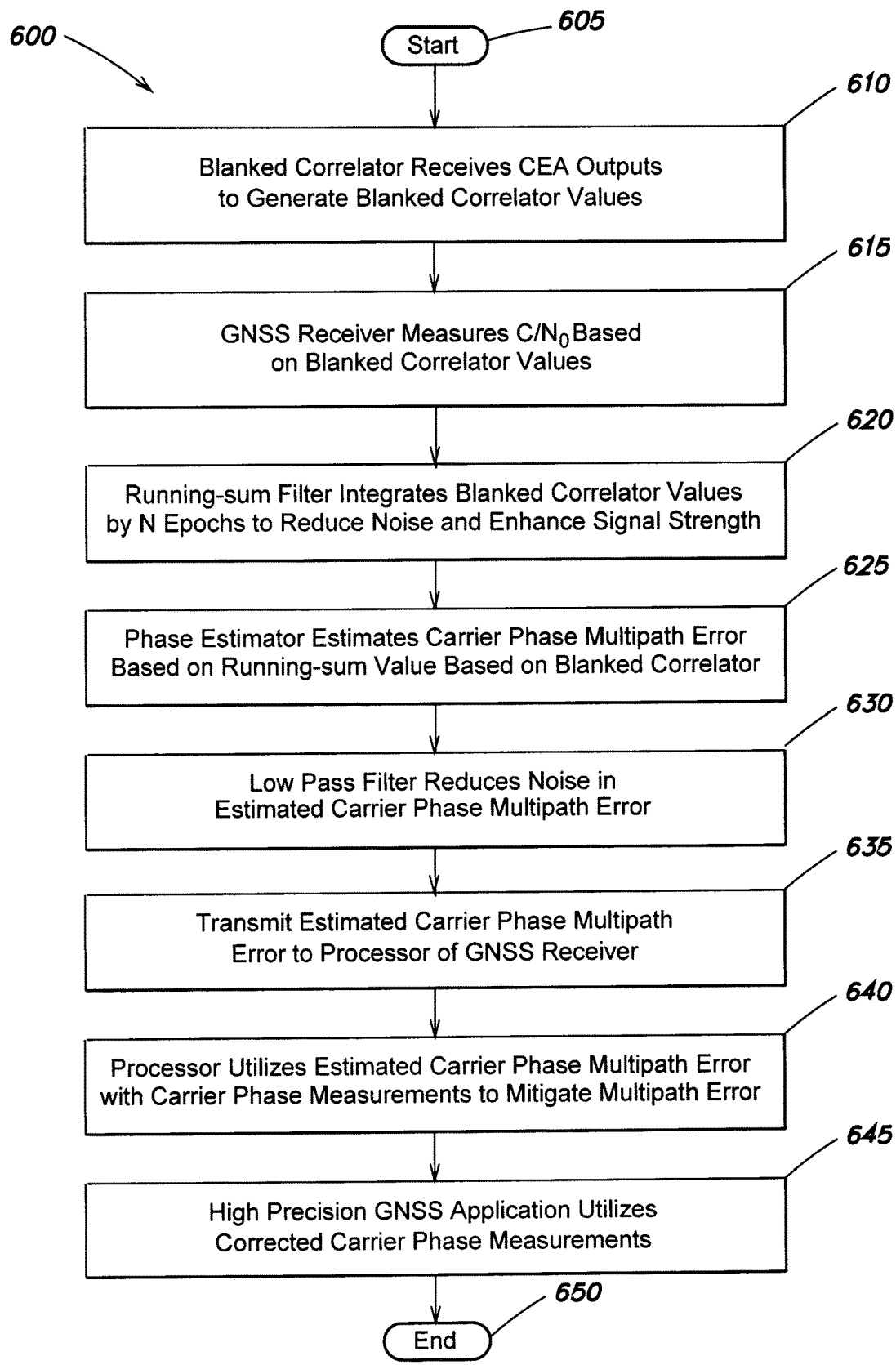
FIG. 6 is an example flow diagram for utilizing a full correlator of a tracking loop in conjunction with a blanked correlator, operating as a monitoring correlator, to implement a carrier phase multipath mitigation technique external to the tracking loop according to one or more embodiments described herein.

FIG. 6 is an example flow diagram for utilizing a full correlator of a tracking loop 114a in conjunction with a blanked correlator 210, operating as a monitoring correlator, to implement a carrier phase multipath mitigation technique external to the tracking loop 114a according to one or more embodiments described herein. The procedure 600 starts at step 605 and continues to step 610 where a blanked correlator 210 receives CEA outputs from the tracking loop 114a to generates blanked correlator values. In an exemplary embodiment, the tracking loop 114a may be a carrier phase tracking loop that utilizes a full correlator, e.g., prompt full correlator 205. The blanked correlator 210 may operate as a monitoring correlator since the blanked correlator 210 does not affect the operation of the tracking loop 114a.

Optionally, the procedure continues to step 615 where the GNSS receiver 104 may measure the $C/N_0$ based on the blanked correlator values of the blanked correlator 210 that may be more reliable, than the prompt full correlator, due to the narrow spacing of the blanked correlator 210. The ratio of the prompt full correlator 205 (F) to the blanked correlator 210 (B) may be k=F/B. The blanked correlator values may be provided to the processor 110, as depicted in FIG. 2, and the processor 110 may calculate value of k in the absence of multipath. The processor 110 may then multiply B by k to estimate the prompt full correlator 205 in the presence of multipath, thus using the blanked correlator 210. The processor 110 may provide the estimate of the prompt full correlator ($P_B$) to the $C/N_0$ measurement unit 113 that estimates $C/N_0$ using the Blanked correlator as $(C/N_0^B)$, where $C/N_0^B$ may be less affected by multipath.

The procedure continues to step 620 where a running-sum filter 212 integrates the blanked correlator values by N epochs to reduce noise and enhance signal strength. Specifically, the running-sum filter 212 may be based on:

$$B = \sum_{i=k-(N-1)}^{k} B_i,$$

where k is an integer that is equal to or greater than N.

The choice of N may depend on the spacing d of the blanked correlator 210 (e.g., d=0.1 chips) and N may be a value from 10 to 20 samples.

The procedure continues to step 625 where a phase estimator 214 estimates the carrier phase multipath error based on the running-sum value, which is based on blanked correlator 210. Specifically, the phase estimator 214 may estimate the carrier phase multipath error based on a $\tan(\Sigma B_Q/\Sigma B_I)$.

Optionally, the procedure continues to step 630 where a low pass filter 216 may smooth the estimated carrier phase multipath error to reduce noise. The output from the low pass filter 216 may be used as corrections for carrier phase measurements. The procedure continues to step 635 where the estimated carrier phase multipath error is transmitted to the processor 110 of the GNSS receiver 104.

The procedure continues to step 640 where the processor 110 of the GNSS receiver 104 utilizes the estimated carrier phase multipath error with the carrier phase measurements to mitigate, i.e., reduce or remove, multipath error in the carrier phase measurements. Specifically, the processor 110 may subtract the estimated carrier phase multipath error from the carrier phase measurements to mitigate the multipath error and generate corrected carrier phase measurements. The procedure may continue to step 645 where a high precision GNSS application 112 may utilize the corrected carrier phase measurement to implement one or more error position and navigation services to compute position with higher accuracy and reduced convergence time. The procedure ends at step 650. It is expressly contemplated that the steps of FIG. 6 may operate continuously over time to more accurately estimate the carrier phase multipath error that may be utilized to correct the carrier phase measurements.

Advantageously, the one or more embodiments described herein leverage the use of the full correlator, e.g., the prompt full correlator 205, in conjunction with the blanked correlator 210 operating as a monitoring correlator to track the carrier while also mitigating carrier phase multipath error.

Figure 7:
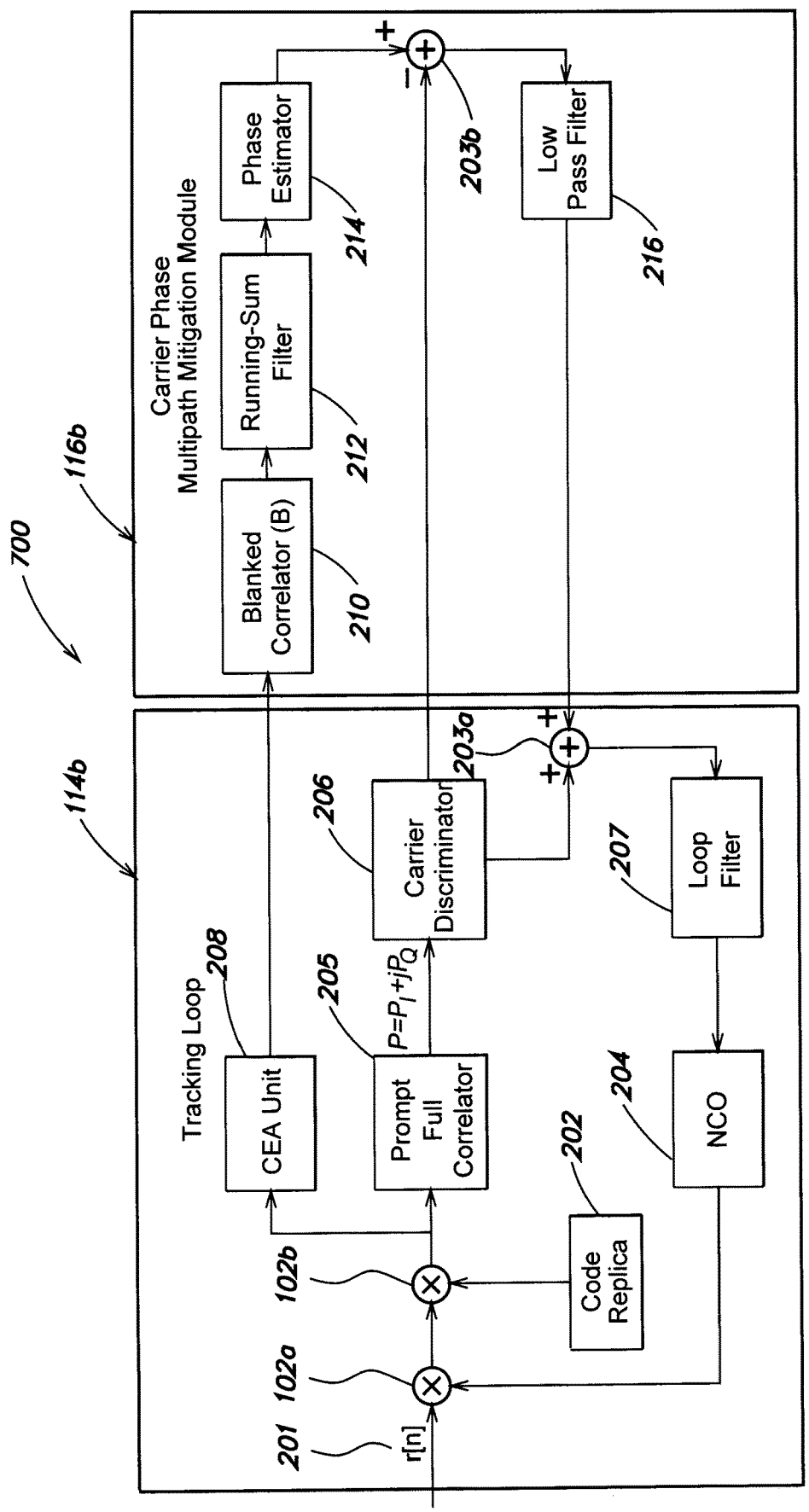
FIG. 7 is an example schematic block diagram of a tracking loop and a carrier phase multipath mitigation module with a blanked correlator, that provides input to the tracking loop, to implement a carrier phase multipath mitigation technique within the tracking loop according to one or more embodiments described herein.

In an exemplary embodiment, multipath mitigation is directly applied within the tracking loop. FIG. 7 is an example schematic block diagram 700 of a tracking loop 114b and a carrier phase multipath mitigation module 116b with a blanked correlator 210, that provides input to the tracking loop 114b, to implement a carrier phase multipath mitigation technique within the tracking loop according to one or more embodiments described herein.

The code replica 202, prompt full correlator 205, carrier discriminator 206, CEA unit 208, NCO 204, and loop filter 207 of the tracking loop 114b may operate in a similar manner as described above with reference to FIG. 2. In addition, the blanked correlator 210, running-sum filter 212, phase estimator 214, and low pass filter 216 of the carrier phase multipath mitigation module 116b may operate in a similar manner as described above with reference to FIG. 2. In an exemplary embodiment, the tracking loop 114b may be a PLL.

Unlike FIG. 2 however, the output of the carrier phase multipath mitigation module 116b of FIG. 7, which is based on the blanked correlator 210, is utilized as an input to the tracking loop 114b to update the discriminator outputs. As such, the discriminator outputs of the carrier discriminator 206 are non-zero mean since the discriminator outputs are influenced by the blanked correlator 210. Accordingly, the carrier phase multipath error for the block diagram 700 in FIG. 7 is not observable based on only the blanked correlator values of the blanked correlator 210 as described above with reference to FIG. 2.

Instead, the carrier phase multipath error in an exemplary embodiment as shown in FIG. 7 is observable based on a subtraction, at adder 203*b*, of the discriminator output (of the carrier discriminator 206) from the output of the phase estimator 214 to account for the additional input to the tracking loop 114*b*. Performing the subtraction isolates the error signal, i.e., the carrier phase multipath error, that can then be added to the discriminator outputs of the carrier discriminator 206 at adder 203*a* to directly mitigate, i.e., reduce or remove, the multipath error in the tracking loop 114*b*.

Advantageously, the one or more embodiments described herein leverage the use of the full correlator, e.g., the prompt full correlator 205, in conjunction with the blanked correlator 210 that provides input to the tracking loop 114*b* to track the carrier while also mitigating carrier phase multipath error.

Figure 8:
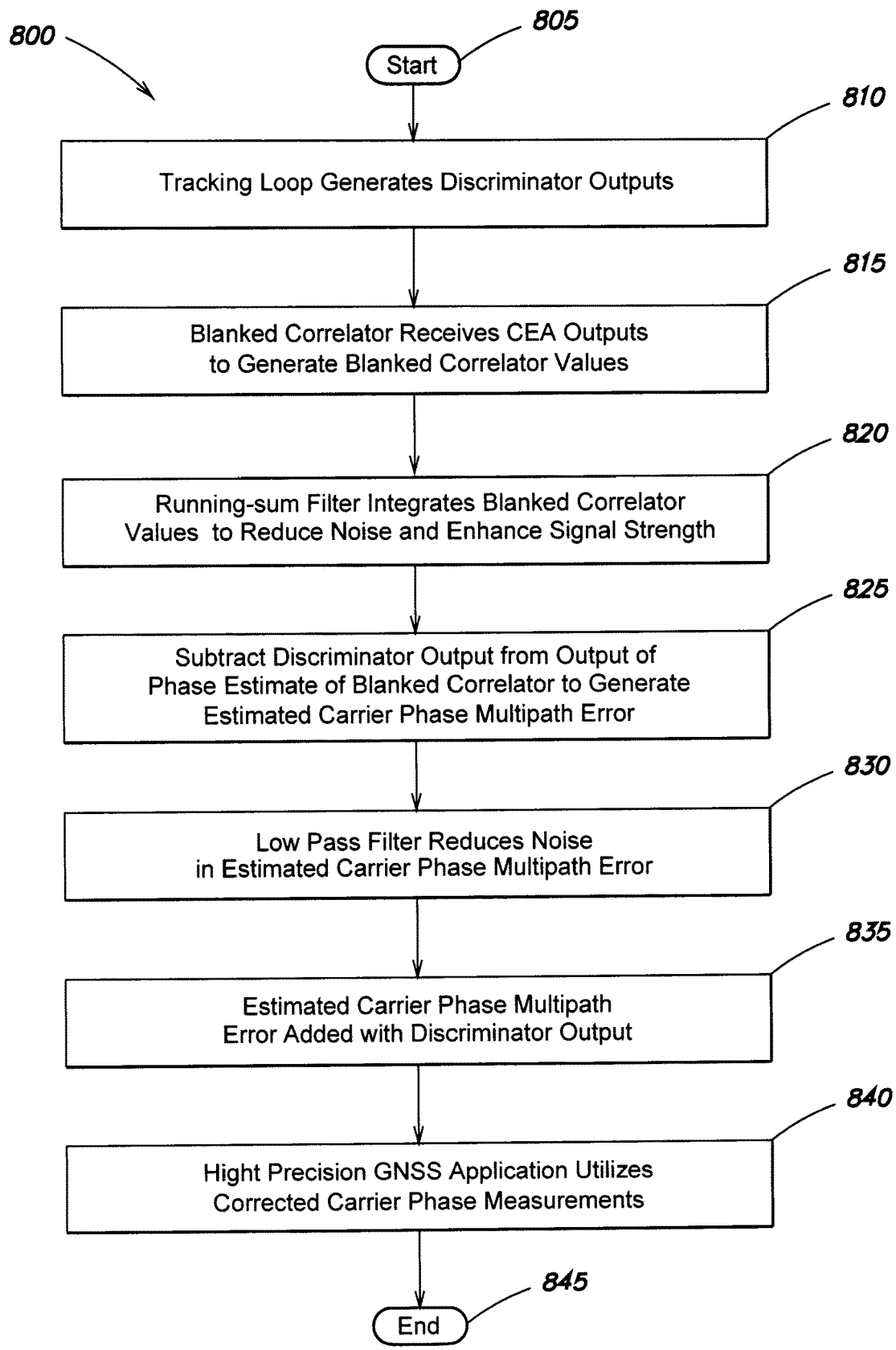
FIG. 8 is an example flow diagram for utilizing a full correlator of a tracking loop in conjunction with a blanked correlator, operating to provide input to the tracking loop, to implement a carrier phase multipath mitigation technique within the tracking loop according to one or more embodiments described herein.

FIG. 8 is an example flow diagram for utilizing a full correlator of a tracking loop 114*b* in conjunction with a blanked correlator 210, operating to provide input to the tracking loop 114*b*, to implement a carrier phase multipath mitigation technique within the tracking loop according to one or more embodiments described herein.

The procedure 800 starts at step 805 and continues to step 810 where a tracking loop 114*b* generates discriminator outputs. In an exemplary embodiment, the tracking loop 114*b* may be a carrier phase tracking loop that utilizes a full correlator, e.g., prompt full correlator 205, that provides outputs utilized by the carrier discriminator 206 to generate the discriminator outputs.

The procedure continues to step 815 where blanked correlator 210 receives CEA values to generate blanked correlator values.

The procedure continues to step 820 where a running-sum filter 212 integrates the blanked correlator values by N epochs to reduce noise and enhance signal strength. Specifically, the running-sum filter 212 may be based on:

$$B = \sum_{i=k-(N-1)}^{k} B_i,$$

where k is an integer that is equal to or greater than N.

The choice of N may depend on the spacing d, of the blanked correlator 210 (e.g., d=0.1 chips) and N may be a value from 10 to 20 samples.

The procedure continues to step 825 where the discriminator output is subtracted from the output (e.g., a $\tan(\Sigma B_Q/\Sigma B_I)$) of the phase estimator 214 of the blanked correlator 210 to generate the estimated carrier phase multipath error. Specifically, the carrier phase multipath mitigation module 116*b* subtracts the discriminator output from the output of the phase estimator 214 of the blanked correlator 210. Optionally, the procedure continues to step 830 where a low pass filter 216 may smooth the estimated carrier phase multipath error to reduce noise.

The procedure continues to step 835 where the estimated carrier phase multipath error is added with the discriminator outputs generated by the carrier discriminator 206 of the tracking loop 114*b* to mitigate, i.e., reduce or remove, the multipath error in the tracking loop 114*b*. Specifically, the tracking loop 114*b* may add the estimated carrier phase multipath error to the discriminator outputs. The procedure may continue to step 840 where a high precision GNSS application 112 may utilize the corrected carrier phase measurements, generated based on adding the estimated carrier phase multipath error to the discriminator outputs, to implement one or more position and navigation services to compute position with higher accuracy and reduced convergence time. The procedure ends at step 845. It is expressly contemplated that the steps of FIG. 8 may operate continuously over time.

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure. For example, although tracking loop 114*a* and 114*b* may include the one or more components as respectively depicted in FIGS. 2 and 7, it is expressly contemplated that an exemplary tracking look 114 may include different and/or additional components to implement the carrier tracking loop technique. In addition, the tracking loops 114*a* and 114*b* may include additional components to implement a code tracking loop technique (not shown), as known by those skilled in the art.

What is claimed is:

1. A Global Navigation Satellite System (GNSS) receiver, comprising:
    an antenna configured to receive one or more navigation signals;
    a tracking loop, including a full correlator, wherein the tracking loop is configured to track at least a carrier of the one or more navigation signals;
    a blanked correlator configured to receive one or more chip-edge accumulation (CEA) outputs and generate one or more blanked correlator values utilizing the one or more CEA outputs; and
    a phase estimator configured to generate a phase estimator output utilizing the blanked correlator values, where the phase estimator output is utilized to generate an estimated carrier phase multipath error.

2. The GNSS receiver of claim 1, where the full correlator is a prompt full correlator that aligns a local replica of a ranging code with the ranging code in the one or more GNSS signals.

3. The GNSS receiver of claim 2, wherein the tracking loop includes a CEA unit configured to accumulate chip edges of the ranging code into a composite chip edge transition to generate the one or more CEA outputs.

4. The GNSS receiver 1, where each blanked correlator value (B) is calculated as:

$$B = b^T w_B,$$

where $$b = [b_1, b_2, \ldots, b_{12}]^T,$$

and where b is a vector and each value $b_i$ represents a different accumulated portion of one chip over which the one or more CEA outputs are generated, $w_B$ is a weight vector that is applied to the values of b, B is a complex value that includes an in-phase component and a quadrature component, and wherein the navigation receiver further comprising:

a running-sum filter configured to sum a plurality of the Bs over N epochs to generate a running-sum value, wherein a running-sum value is calculated as:

running-sum value=$\Sigma B_I + j \Sigma B_Q$, where $B_1$ is the in-phase component component of B, $B_Q$ is the quadrature component of B, and the phase estimator is configured generate the phase estimator output based on atan($\Sigma B_Q / \Sigma B_I$).

5. The GNSS receiver of claim 1, wherein the blanked correlator operates as a monitoring correlator and the phase estimator output is the estimated carrier phase multipath error.

6. The GNSS receiver of claim 1, further comprising:
a processor configured to subtract the estimated carrier phase multipath error from one or more carrier phase measurements to generate one or more corrected carrier phase measurements.

7. The GNSS receiver of claim 1, further comprising:
a processor configured to measure a carrier-to-noise power ratio (C/N0) based on the blanked correlator values of the blanked correlator.

8. The navigation receiver of claim 1, wherein the blanked correlator provides input to the tracking loop, and wherein the tracking loop further includes a phase discriminator configured to:
generate a discriminator output based on a correlator output of the full correlator,
wherein the discriminator output is subtracted from the phase estimator output of the blanked correlator to generate the estimated carrier phase multipath error.

9. The GNSS receiver of claim 8, wherein the tracking loop is further configured to add, within the tracking loop, the estimated carrier phase multipath error to the discriminator output to generate a corrected carrier phase measurement.

10. A method, comprising:
receive, at an antenna, one or more navigation signals;
tracking, by a tracking loop including a full correlator, a carrier of the one or more navigation signals;
receiving, at a blanked correlator, one or more Chip-Edge Accumulated (CEA) outputs from the tracking loop and generating one or more blanked correlator values utilizing the one or more CEA outputs;
generating a phase estimator output utilizing the one or more blanked correlator values, where the phase estimator output is utilized to generate an estimated carrier phase multipath error.

11. The method of claim 10, where the full correlator is a prompt full correlator that aligns a local replica of a ranging code with the ranging code in the one or more navigation signals.

12. The method of claim 11, further comprising:
accumulating, at a CEA unit of the tracking loop, chip edges of the ranging code into a composite chip edge transition to generate the one or more CEA outputs.

13. The method of claim 10, where each blanked correlator value (B) is calculated as:

$B = b^T w_B$, where $b = [b_1, b_2, \ldots, b_{12}]^T$, where b is a vector and each value $b_i$ represents a different accumulated portion of one chip over which the one or more CEA outputs are generated, $w_B$ is a weight vector that is applied to the values of b, and the method further comprising:
summing, by a running-sum filter, a plurality of the B s over N epochs to generate a running-sum value, wherein a running-sum value is calculated as:

running-sum value=$\Sigma B_I + j \Sigma B_Q$, where $B_1$ is the in-phase component component of B, $B_Q$ is the quadrature component of B, and the phase estimator is configured to generate the phase estimator output based on atan($\Sigma B_Q / \Sigma B_I$).

14. The method of claim 10, wherein the blanked correlator operates as a monitoring correlator and the phase estimator output is the estimated carrier phase multipath error.

15. The method of claim 10, further comprising:
subtracting, by the GNSS receiver, the estimated carrier phase multipath error from one or more carrier phase measurements to generate one or more corrected carrier phase measurements.

16. The method of claim 15, further comprising:
measuring a carrier-to-noise power ratio (C/$N_0$) based on the blanked correlator values of the blanked correlator.

17. The method of claim 10, wherein the blanked correlator provides input to the tracking loop, the method further comprising:
generating, by a carrier discriminator of the tracking loop, a discriminator output based on a correlator output of the full correlator,
subtracting the discriminator output from the phase estimator output of the blanked correlator to generate the estimated carrier phase multipath error.

18. The method of claim 17, further comprising:
adding, within the tracking loop, the estimated carrier phase multipath error to the discriminator output to generate a corrected carrier phase measurement.

19. A Global Navigation Satellite System (GNSS) receiver, comprising:
an antenna configured to receive one or more GNSS signals;
a tracking loop including:
a full correlator configured to generate one or more correlator outputs based on a ranging code in the one or more GNSS signals,
a carrier discriminator configured to generate a discriminator output based on the one or more correlator outputs, and
a chip-edge accumulation (CEA) unit configured to accumulate chip edges of the ranging code into a composite chip edge transition to generate one or more CEA outputs;
a carrier phase multipath mitigation module including:
a blanked correlator configured to receive the one or more CEA outputs and generate a plurality of blanked correlator values utilizing the one or more CEA outputs,
a running sum filter configured to sum the plurality of the blanked correlator values to generate a running-sum value, wherein each blanked correlator value (B)=$B_I + B_Q$ and wherein the running-sum value is calculated as:

running-sum value=$\Sigma B_I + j \Sigma B_Q$, wherein I is an in-phase component and Q is a quadrature component, and a phase estimator configured generate a phase estimator output based on $\text{atan}(\Sigma B_Q/\Sigma B_I)$, wherein the phase estimator output is an estimated carrier phase multipath error when the blanked correlator operates as a monitoring correlator, and wherein the discriminator output is subtracted from the phase estimator output of the blanked correlator to generate the estimated carrier phase multipath error when the blanked correlator provides input to the tracking loop.

20. The GNSS receiver of claim 19, wherein the estimated carrier phase multipath error is subtracted from carrier phase measurements when the blanked correlator operates as the monitoring correlator, and wherein the estimated carrier phase multipath error is added, within the tracking loop, to the discriminator output when the blanked correlator provides input to the tracking loop.

* * * * *

UNITED STATES PATENT AND TRADEMARK OFFICE
CERTIFICATE OF CORRECTION

PATENT NO. : 11,506,794 B2
APPLICATION NO. : 16/854479
DATED : November 22, 2022
INVENTOR(S) : Ali Broumandan It is certified that error appears in the above-identified patent and that said Letters Patent is hereby corrected as shown below:

In the Claims

Claim 4 Column 10, Line 58:
4. The GNSS receiver 1 , where each blanked correlator
Should read:
4. The GNSS receiver of claim 1, where each blanked correlator Claim 4 Column 11, Line 11:
where $B_1$, is the in-phase component component of B, $B_Q$,
Should read:
where $B_1$, is the in-phase component of B, $B_Q$, Claim 13 Column 12, Line 10:
where $B_1$, is the in-phase component component of B, $B_Q$ is,
Should read:
where $B_1$, is the in-phase component of B, $B_Q$ is, Signed and Sealed this
Fifteenth Day of August, 2023

Katherine Kelly Vidal
*Director of the United States Patent and Trademark Office*